(12) United States Patent
Love

(10) Patent No.: US 9,282,733 B2
(45) Date of Patent: Mar. 15, 2016

(54) TRAP-SETTING APPARATUS

(71) Applicant: Bruce Love, Burlingame, KS (US)

(72) Inventor: Bruce Love, Burlingame, KS (US)

(*) Notice: Subject to any disclaimer, the term of this patent is extended or adjusted under 35 U.S.C. 154(b) by 57 days.

(21) Appl. No.: 14/155,918

(22) Filed: Jan. 15, 2014

(65) Prior Publication Data
US 2015/0196020 A1    Jul. 16, 2015

(51) Int. Cl.
*B66F 15/00* (2006.01)
*A01M 23/24* (2006.01)

(52) U.S. Cl.
CPC .............. *A01M 23/245* (2013.01); *B66F 15/00* (2013.01)

(58) Field of Classification Search
CPC .................. A01M 23/00–23/38; B66F 15/00; F41B 5/1469
USPC ............................. 43/97; 254/129, 131, 131.5
See application file for complete search history.

(56) References Cited

U.S. PATENT DOCUMENTS

| 1,532,068 | A | 3/1925 | Olson | |
| 1,933,756 | A * | 11/1933 | Prescott | 254/131 |
| 3,800,463 | A | 4/1974 | Treadwell | |
| 4,115,945 | A | 9/1978 | Hession et al. | |
| 4,245,424 | A | 1/1981 | Smith | |
| 4,264,055 | A * | 4/1981 | Strange | 254/243 |
| 4,807,389 | A | 2/1989 | Scherrinsky | |
| 5,360,199 | A * | 11/1994 | Speier | 254/129 |
| 6,199,314 | B1 * | 3/2001 | Ballard | 43/97 |
| 6,502,346 | B1 | 1/2003 | Jokinen | |
| 6,520,482 | B1 * | 2/2003 | Bigham | 254/131 |
| 6,964,442 | B1 * | 11/2005 | Radcliff | 294/17 |
| 7,861,382 | B1 * | 1/2011 | Madachy et al. | 24/68 CD |
| 2005/0161652 | A1 * | 7/2005 | Morgan | 254/218 |
| 2010/0127226 | A1 * | 5/2010 | Smith | 254/27 |

* cited by examiner

*Primary Examiner* — Lee D Wilson
*Assistant Examiner* — Henry Hong
(74) *Attorney, Agent, or Firm* — Dale J. Ream

(57) ABSTRACT

A trap-setting apparatus for use in setting a dog-proof trap that includes a continuous side wall, a spring member that is movable between a tripped configuration extending away from the side wall and a rigging configuration adjacent thereto. The trap-setting apparatus includes a cam member and an elongate handle having a proximal member coupled thereto and a distal end displaced therefrom, the handle being configured to rotate the cam member when moved. The trap-setting apparatus includes a pair of hook members each having a first end coupled to the cam member and a second end selectively coupled to the spring member of the dog-proof trap. In use, a user movement of the handle causes the cam member to rotate relative to the side wall of the trap and to move the spring member from the tripped configuration toward the rigging configuration.

6 Claims, 5 Drawing Sheets

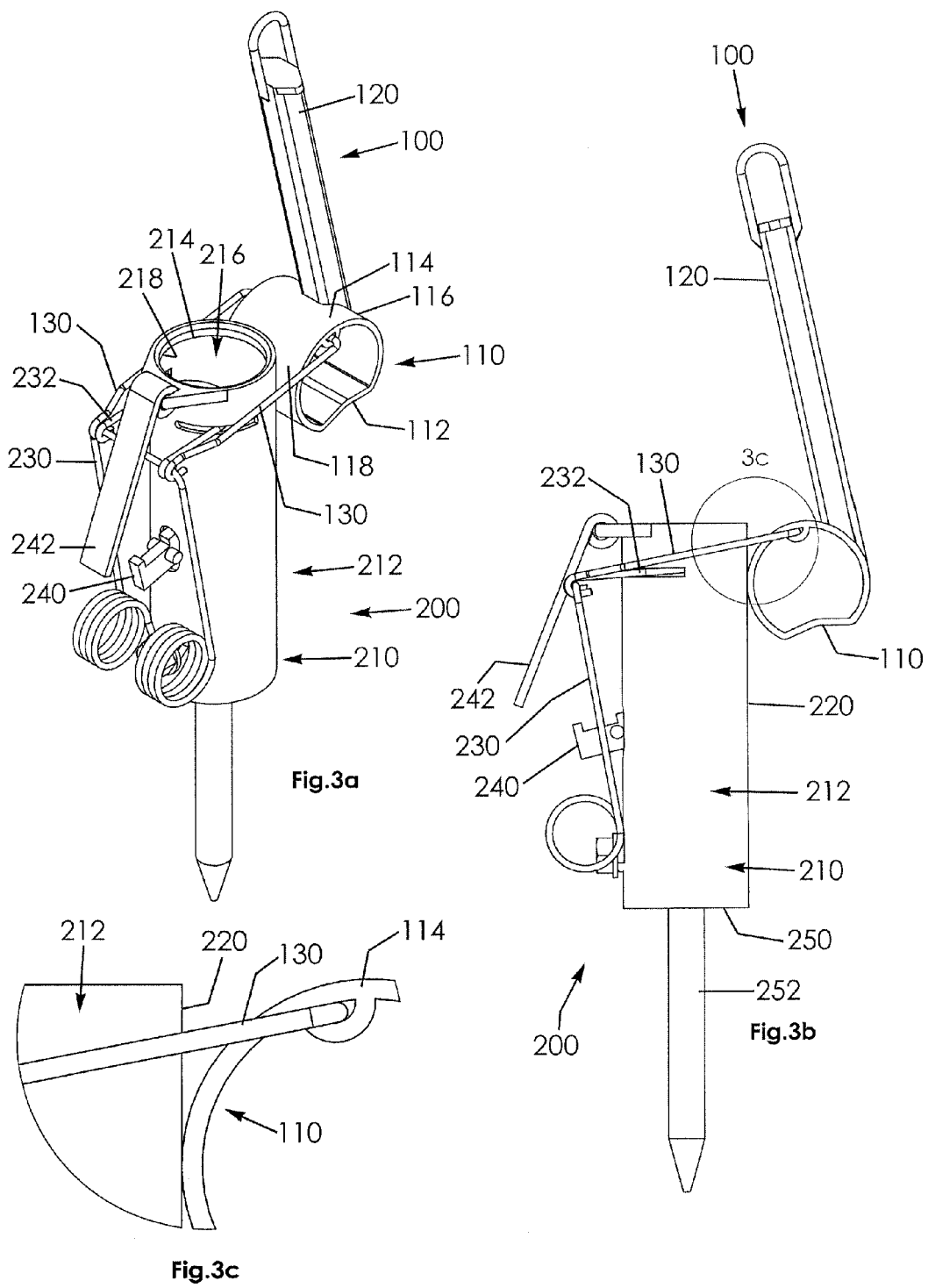

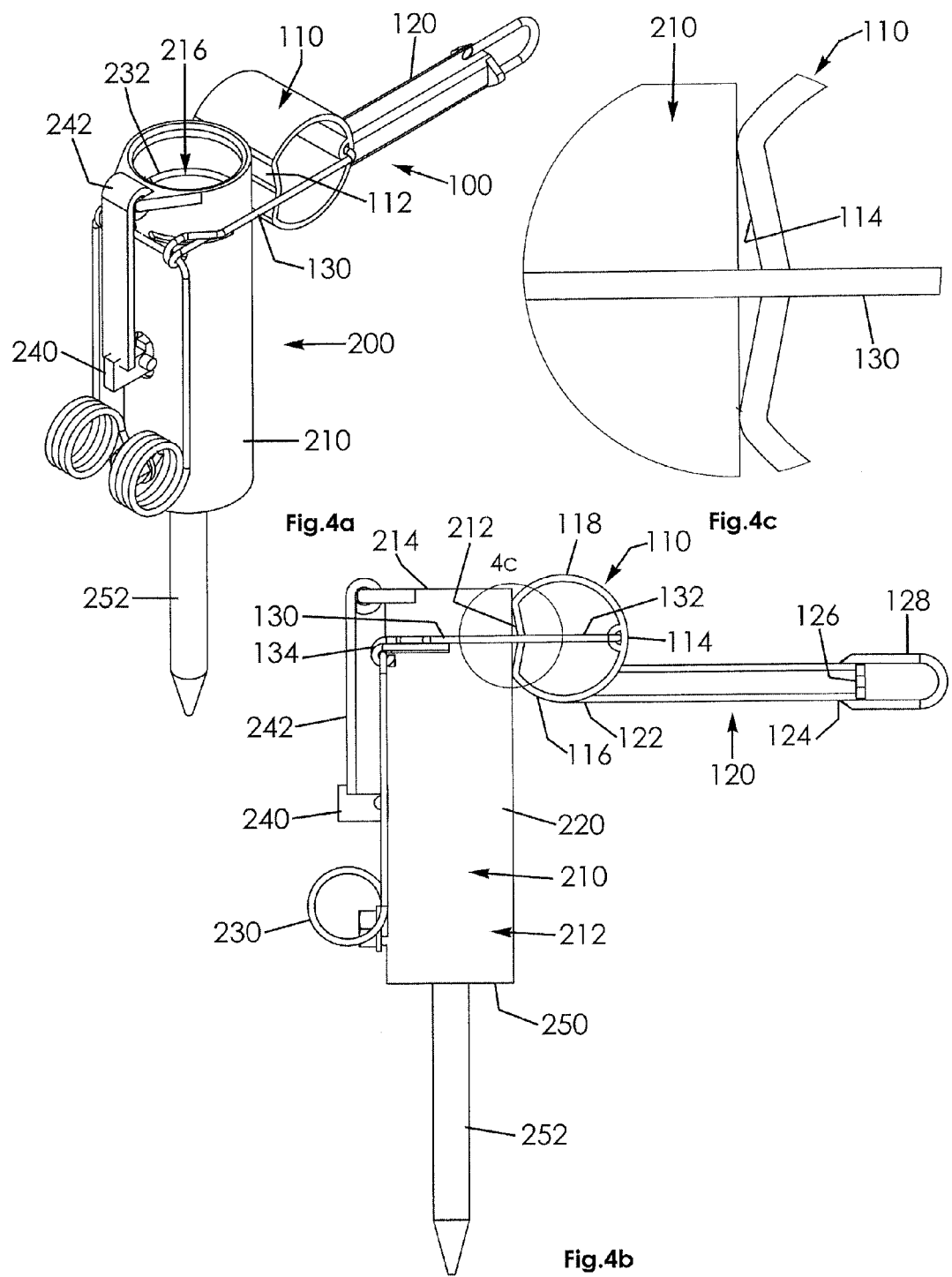

TRAP-SETTING APPARATUS

BACKGROUND OF THE INVENTION

This invention relates generally to animal traps and, more particularly, to a dog-proof trap-setting apparatus. The trap-setting apparatus enables the steady and easy setting of an animal trap that is otherwise awkward and dangerous.

Animal traps have been used for many years to catch or kill undesirable animals, including rodents such as rats or larger nuisances such as raccoons or possums. Some traps include spring loaded clamps. A user moves the clamp to a "set" configuration and the spring snaps the clamp to a tripped configuration to capture or kill an animal when triggered by the target animal's proximity. Unfortunately, these trigger-type traps are often very tricky to set and often get inadvertently triggered by the person setting them, leading to frustration and fear of injury. One such trap is the dog-proof type trap which includes a structure having a configuration that does not allow a dog to become in dangerous proximity to the trap mechanism of a popular type of an animal trap.

Various devices have been proposed or marketed that seek to provide assistance in setting a trap. Although assumably effective for their intended purposes, the existing devices do not use the trap itself to leverage the trap-setting procedure. Specifically, existing trap-setting tools do not include a cam member to impart rotational torque in order to move a spring member and a clamp member from a "tripped" configuration to a "rigging" configuration or from the rigging configuration to a "set" configuration.

Therefore, it would be desirable to have a trap-setting apparatus that includes a cam member for quickly and safely setting a dog-proof trap with minimal effort. Further, it would be desirable to have a trap-setting apparatus that selectively hooks onto the trap's main body member and onto the trap's spring member so as to enable setting the trap with a simple repositioning of a handle.

SUMMARY OF THE INVENTION

A trap-setting apparatus is for use in setting a dog-proof trap of a type that includes a body member having a continuous side wall and having a spring member that is movable between a normally biased tripped configuration extending away from the body member and a rigging configuration adjacent the body member. The trap-setting apparatus includes a cam member and an elongate handle having a proximal end coupled to the cam member and a distal end displaced therefrom, the handle being configured to impart rotational force to the cam member when moved.

The trap-setting apparatus includes a pair of hook members, each hook member having a first end coupled to the cam member and a second end having a generally U-shaped configuration selectively coupled to the spring member of the dog-proof trap. In use, a user movement of the handle causes the cam member to rotate relative to the side wall of the trap and to move the spring member and the clamp member from the tripped configuration toward the rigging configuration. While the spring member and the clamp member are being held in the rigging configuration, a trigger member can be moved to a set configuration. After the trigger member has been set, a user movement of the handle causes the cam member to rotate relative to the side wall of the trap and to move the spring member and the clamp member from the rigging configuration toward the set configuration.

Therefore, a general object of this invention is to provide a trap-setting apparatus that, when operated, makes moving the spring member of a dog-proof trap from a tripped configuration to a rigging configuration a quick and almost effortless matter of rotating a handle.

Another object of this invention is to provide a trap-setting apparatus, as aforesaid, that selectively couples to the dog-proof trap for ease of operation.

Still another object of this invention is to provide a trap-setting apparatus, as aforesaid, that safely and effortlessly holds a spring member of a dog-proof trap in a rigging configuration.

Yet another object of this invention is to provide a trap-setting apparatus that, when operated, makes moving the spring member of a dog-proof trap from a rigging configuration to a set configuration a quick and almost effortless matter of rotating a handle.

A further object of this invention is to provide a trap-setting apparatus that may be selectively coupled to a belt, a wall, or to the dog-proof trap for ease of storage.

A still further object of this invention is to provide a trap-setting apparatus that is easy to use and inexpensive to manufacture.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is a side view of the trap-setting apparatus as in FIG. 2a;

FIG. 3a is a perspective view of the trap-setting apparatus, as in FIG. 1a, in use with a spring member of a dog-proof trap located between a tripped configuration and a set configuration;

FIG. 3b is a side view of the trap-setting apparatus as in FIG. 3a;

FIG. 3c is an isolated view on an enlarged scale taken from FIG. 3b;

FIG. 4a is a perspective view of the trap-setting apparatus, as in FIG. 1b, in use with a spring member of a dog-proof trap in a rigging configuration;

FIG. 4b is a side view of the trap-setting apparatus as in FIG. 4a; and

FIG. 4c is an isolated view on an enlarged scale taken from FIG. 4b.

DESCRIPTION OF THE PREFERRED EMBODIMENT

Figure 1A:
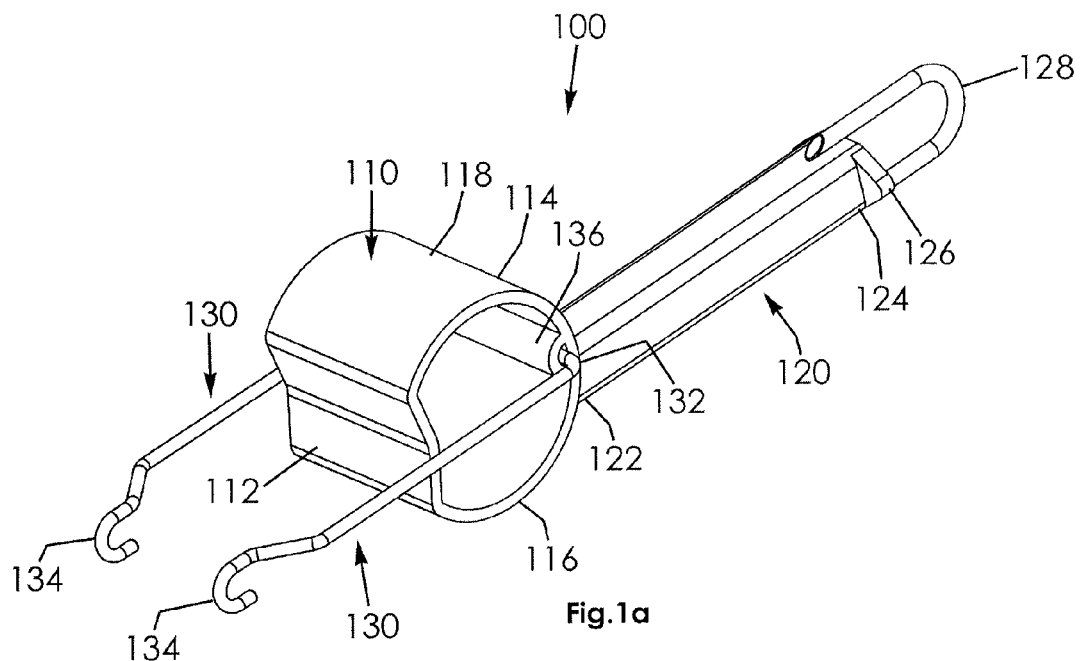
FIG. 1a is a perspective view of a trap-setting apparatus according to a preferred embodiment of the present invention.

A trap-setting apparatus according to a preferred embodiment of the present invention will now be described with reference to FIGS. 1a to 4c of the accompanying drawings. The trap-setting apparatus 100 may be used in setting a dog-proof trap 200. The trap-setting apparatus 100 includes a cam member 110, a handle 120, and a pair of hook members 130.

The dog-proof trap 200 includes a body member 210, a clamp member 232, a spring member 230, and a trigger member 240.

Figure 2A:
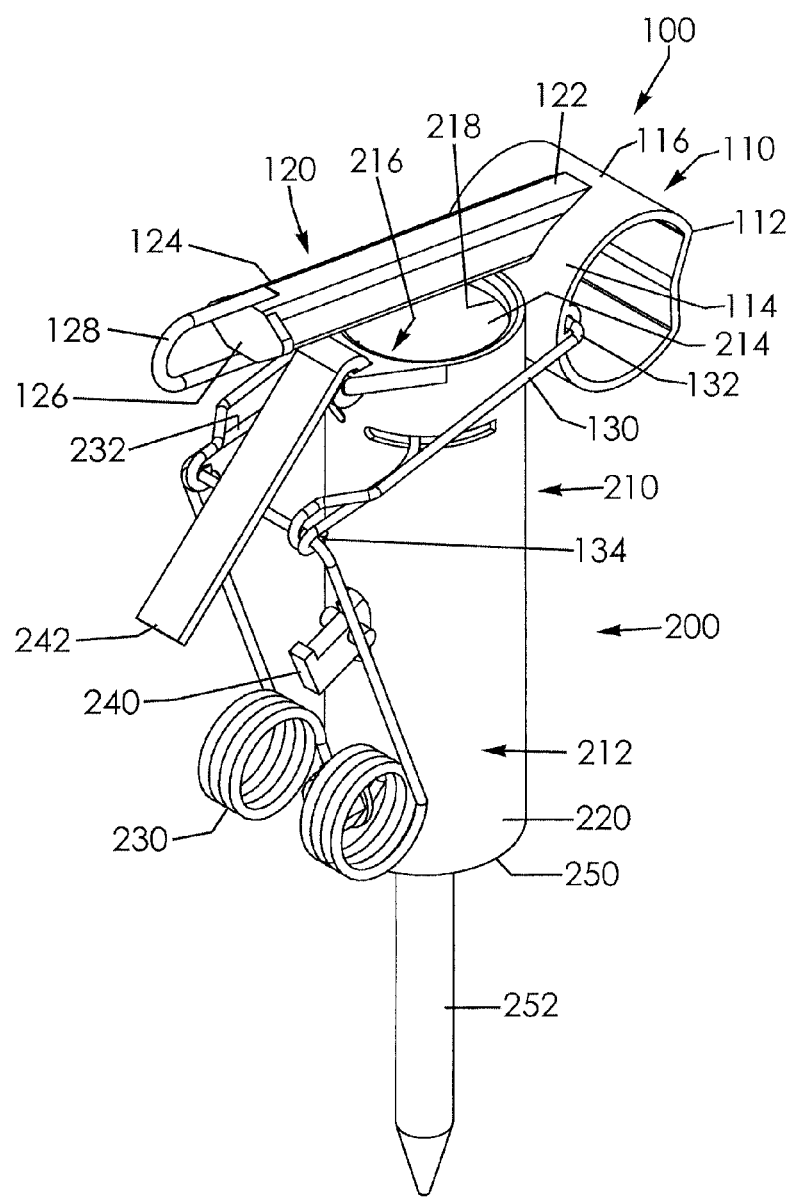
FIG. 2a is a perspective view of the trap-setting apparatus, as in FIG. 1a, in use with a spring member of a dog-proof trap in a tripped configuration.

The body member 210 of the dog-proof trap 200 includes a continuous side wall 212 (FIG. 2a). The continuous side wall 212 defines an open top 214 and a generally open interior area 216 extending downwardly from the open top 214. The body member 210 may also include a bottom plate coupled to the side wall 212 and opposed to the open top 214. A spike member 252 may extend downwardly from the bottom plate 250.

The spring member 230, the clamp member 232, and the trigger member 240 are each coupled to the body member 210 (FIG. 2a). The clamp member 232 and the trigger member 240 are each positioned at least partially within the interior area 216 of the body member 210. The trigger member 240 is downwardly displaced from the clamp member 232.

The clamp member 232 and the spring member 230 are moveable between a tripped configuration (FIG. 2a), a rigging configuration (FIG. 4a), and a set configuration (not shown). The spring member 230 biases the clamp member 232 towards the tripped configuration. Preferably, the spring is a torsion spring that normally "pulls" the clamp member 232 away from the body portion 210 and toward the triggered configuration. In the rigging configuration the spring member 230 is positioned adjacent to the body member (FIG. 4b). In the set configuration the clamp member 232 is positioned such that an animal may insert its arm into the interior area 216 of the body member 210, past the clamp member 232, towards the trigger member 240. In the tripped configuration the spring member 230 extends away from the body member 210 and the clamp member 232 is positioned such that the animal's arm is retained within the interior area 216 of the body member 210.

The trigger member 240 is movable between the tripped configuration (FIG. 2a) and the set configuration (FIG. 4a). In the set configuration, the trigger member 240 may prevent the spring member 230 from moving the clamp member 232 to the tripped configuration. More particularly, a holding member 242 may be coupled to the body member 210 and may be configured to prevent the spring member 230 from moving the clamp member 232 towards the tripped configuration when the trigger member 240 is moved to the set configuration and selectively coupled to the holding member 242 and the spring member 230 and the clamp member 232 are moved to the set configuration.

The trap-setting apparatus 100 may be used to selectively move the spring member 230 and the clamp member 232 of the dog-proof trap 200 from the tripped configuration toward the rigging configuration. More particularly, the trap-setting apparatus 100 may be used to selectively move the clamp member 232 when the cam member 110 of the trap-setting apparatus 100 is positioned on a side of the body member 210 of the dog-proof trap 200 that is opposite the spring member 230 of the dog-proof trap and the handle 120 of the trap-setting apparatus 100 is operated so as to rotate the cam member 110 relative to the body member 210.

In use, the cam member 110 of the trap-setting apparatus 100 bears against an outer surface 220 of the body member 210 of the dog-proof trap 200. The cam member 110 may include a bottom wall 112, a top wall 114 opposed to the bottom wall 112, and opposed first 116 and second 118 side walls extending between the bottom wall 112 and the top wall 114. The top wall 114 of the cam member 110 may be positioned against the outer surface 220 of the body member 210 of the dog-proof trap 200 when the spring member 230 of the dog-proof trap 200 is positioned in the tripped configuration (FIG. 2a). The bottom wall 112 may be positioned against the outer surface 220 when the spring member 230 is in the rigging configuration (FIG. 4a).

The cam member 110 may be configured to rotate relative to the body member 210 of the dog-proof trap 200. More particularly, the cam member 110 may bear against the outer surface 220 of the body member 210 as it rotates. Rotation of the cam member 110 may move the spring member 230 of the dog-proof trap 200 between the triggered configuration, the rigging configuration, and the set configuration as described below.

In one embodiment, the cam member 110 includes a generally cylindrical configuration (FIG. 1a) so as to enable smooth rotation of the cam member 110 as it bears against the outer surface 220 of the body member 210. The bottom wall 112 may have a generally flat configuration (FIG. 1a) so as to securely hold the spring member 230 of the dog-proof trap 200 in the rigging configuration (FIG. 4b).

The handle 120 includes a proximal end 122 and a distal end 124. The proximal end 122 of the handle 120 is coupled to the cam member 110. More particularly, the proximal end 122 of the handle 120 may be coupled to the first side wall 116 of the cam member 110 such that the handle 120 extends away from the top wall 114 of the cam member 110. The distal end 124 may be displaced from the proximal end 122 and the cam member 110 such that the handle 120 has an elongate configuration, such as a generally linear configuration.

Figure 1B:
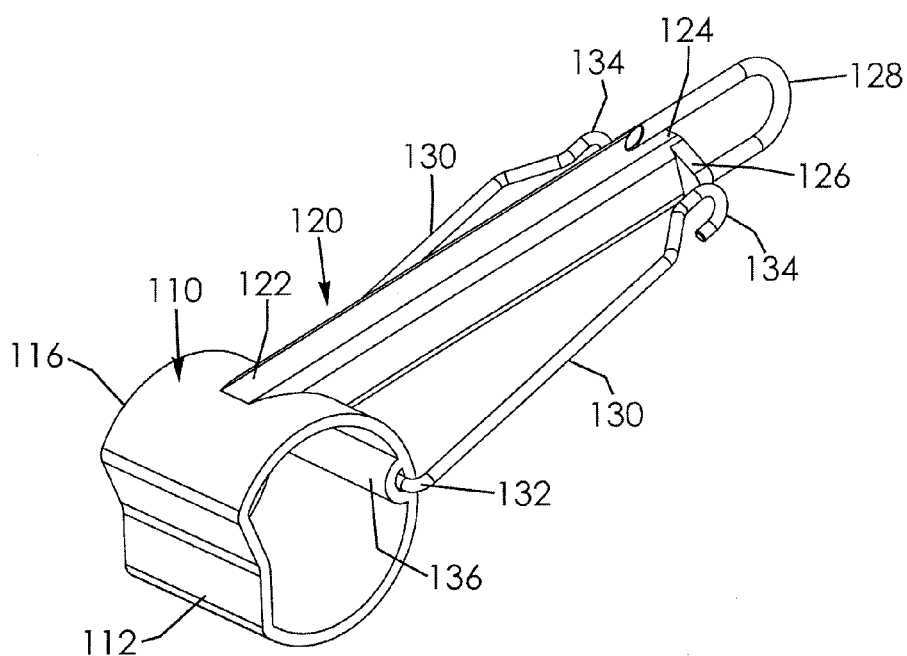
FIG. 1b is a perspective view of the trap-setting apparatus, as in FIG. 1a, shown from a different angle.

The handle 120 is configured to selectively apply rotational torque to the cam member 110 when a force is applied to the distal end 124 of the handle 120. The distal end 124 of the handle 120 may include at least one flange member 126 and at least one ring member 128. The flange member 126 may help a user grip the distal end 124 of the handle 120. In addition, the flange member 126 is configured to engage second ends 134 of respective hook member 130 and to hold the hook members 130 in a stowed configuration (FIG. 1b). The ring member 128 may allow a user to selectively couple the trap-setting apparatus 100 to a belt (not shown), a wall (not shown), or to the dog-proof trap 200 for ease of storage or transport.

Each hook member 130 has a first end 132 coupled to the cam member 110 and a second end 134 selectively coupled to the spring member 230 of the dog-proof trap. The hook members 130 may be coupled together at their respective first ends 132. The second end 134 of each hook member 130 may include a generally U-shaped configuration configured to selectively couple to the spring member 230 of the dog-proof trap 200.

Each hook member 130 may be rotatably coupled to the cam member 110. The top wall 114 of the cam member 110 may define a channel 136 and the first ends 132 of the hook members 130 may be situated within the channel 136 so as to accommodate selectively rotating the hook members 130.

Figure 2B:
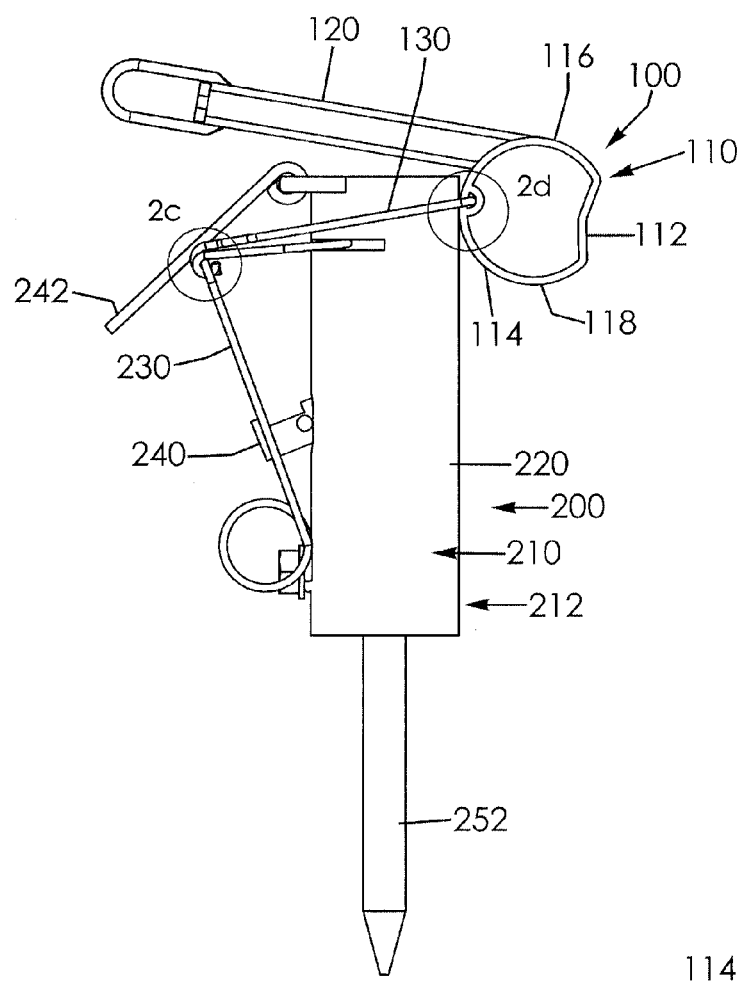
Figure 2C:
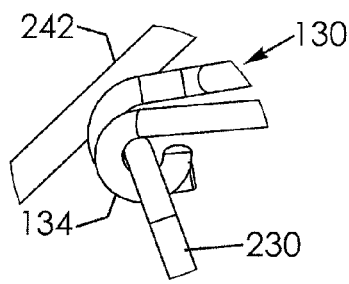
FIG. 2c is an isolated view on an enlarged scale taken from FIG. 2b.
Figure 2D:
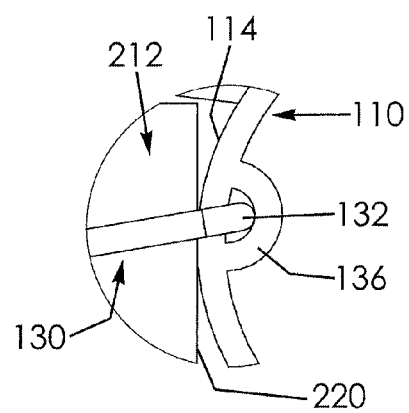
FIG. 2d is an isolated view on an enlarged scale taken from FIG. 2b.

In use, the trap-setting apparatus 100 can be mounted to a dog-proof trap 200 while the trap is at a triggered configuration (FIG. 2a), i.e. when the trap is not set. Specifically, the top wall 114 of the cam member 110 may be positioned against the outer surface 220 of the body member 210 of the dog-proof trap 200 when the spring member 230 of the dog-proof trap 200 is positioned in the tripped configuration (FIG. 2a). Further, the U-shaped ends of the hook members 130 are coupled to the spring member 230 adjacent where the clamp member 232 is coupled to the spring member 230, as shown in FIGS. 2a to 2c.

Then, the handle 120 may be moved (raised and rotated) so as to apply rotational torque to the cam member 110 as described above. As the cam member 110 rotates from the triggered configuration (FIG. 2a) to a partially set configuration (FIG. 3b) to the rigging configuration (FIG. 4b), the spring member 230 moves to a position adjacent the side wall 212 of the body member 210 of the trap 200 which urges the clamp member 232 into the interior area of the body member 210. In the full rigging configuration (FIGS. 4a and 4b), the holding member 242 may be received by the trigger member 240 and the trap is "set" (the set configuration). The trap setting apparatus 100 may then be removed from the dog-proof trap 200 and the trap may be positioned for use. Specifically, the spike member 252 may be pressed into the ground and the trap left to catch a rodent in due course.

It is understood that while certain forms of this invention have been illustrated and described, it is not limited thereto except insofar as such limitations are included in the following claims and allowable functional equivalents thereof.

The invention claimed is:

1. A trap-setting apparatus for use in setting a dog-proof trap of a type that includes a body member having a continuous side wall defining an open top and a generally open interior area, a clamp member movable between a tripped configuration and A rigging configuration, and a spring member biasing said clamp member towards said tripped configuration, said trap-setting apparatus comprising:
   a cam member that includes a bottom wall having a generally flat configuration, a top wall opposed to said bottom wall and having a generally cylindrical configuration, and first and second side walls extending between said bottom wall and said top wall;
   an elongate handle having a proximal end coupled to said cam member and an opposed distal end displaced from said proximal end, said handle configured to selectively apply rotational torque to said cam member when operated;
   wherein said proximal end of said handle is coupled to said first side wall of said cam member such that said handle extends away from said top wall;
   a pair of hook members, each hook member having a first end rotatably coupled to said cans member and a second end having a U-shaped configuration selectively coupled to the spring member of the dog-proof trap, said first ends being coupled together and situated in a channel defined by said cam member such that said pair of hook members move together simultaneously;
   wherein;
   said top wall of said cam member is positioned against the outer surface of the body member of the dog-proof trap when the spring member of the dog-proof trap is positioned in the tripped configuration;
   said bottom wall of said cam member is positioned against the outer surface of the body member of the dog-proof trap when the spring member of the dog-proof trap is positioned in the rigging configuration; and
   said cam member is rotated by operation of said handle member so as to move the spring member of the dog-proof trap between the triggered configuration and the rigging configuration.

2. The trap-setting apparatus as in claim 1, wherein said handle includes a generally linear configuration.

3. The trap-setting apparatus as in claim 1, wherein said distal end of said handle includes a flange member configured to receive respective second ends of said pair of hook members at a stowed configuration.

4. The trap-setting apparatus as in claim 1, wherein said distal end of said handle includes a ring member.

5. The trap-setting apparatus as in claim 1, wherein respective first ends of said hook members are coupled together.

6. The trap-setting apparatus as in claim 1, wherein said cam member defines an interior space and includes a sleeve situated in said interior space, said sleeve defining said channel in which said first ends of said pair of hook members are situated and coupled together.

* * * * *